United States Patent
Zhong et al.

(10) Patent No.: US 10,616,967 B1
(45) Date of Patent: Apr. 7, 2020

(54) DIMMER WITH SNUBBER CONTROL CIRCUIT

(71) Applicant: EATON INTELLIGENT POWER LIMITED, Dublin (IE)

(72) Inventors: Kevin Zhong, Shanghai (CN); Hoon Lee, Suwanee, GA (US); Saivaraprasad Murahari, Peachtree City, GA (US); Lily Du, Shanghai (CN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/387,855

(22) Filed: Apr. 18, 2019

(51) Int. Cl.
*H05B 33/08* (2020.01)
*H02M 1/34* (2007.01)
*H02M 1/00* (2006.01)

(52) U.S. Cl.
CPC .......... *H05B 33/0845* (2013.01); *H02M 1/34* (2013.01); *H02M 2001/0048* (2013.01)

(58) Field of Classification Search
CPC ................ H05B 33/0845; H02M 1/34; H02M 2001/0048
See application file for complete search history.

(56) References Cited

U.S. PATENT DOCUMENTS

| | | | |
|---|---|---|---|
| 2015/0351174 A1* | 12/2015 | Chen | H05B 33/0815 315/127 |
| 2016/0205733 A1* | 7/2016 | Chen | H05B 33/0815 315/201 |
| 2017/0170720 A1* | 6/2017 | Gao | H02M 1/4208 |
| 2017/0194955 A1* | 7/2017 | Gumina | H03K 17/08146 |

* cited by examiner

*Primary Examiner* — Raymond R Chai
(74) *Attorney, Agent, or Firm* — Eckert Seamans Cherin & Mellott, LLC

(57) ABSTRACT

A dimmer includes a processing unit structured to generate a dimming control signal, wherein in the on state the dimming control signal has a constant voltage with a low pulse a predetermined time after each zero-crossing in power flowing through the hot conductor and in the off state the dimming control signal has a constant voltage, a load control circuit structured to electrically connect between the hot conductor and the load conductor and to selectively electrically connect the hot conductor to the load conductor based on the dimming control signal, and a snubber control circuit including a snubber structured to electrically couple between the hot conductor and the load conductor, wherein the snubber control circuit is structured to activate the snubber when the dimming control signal has the on state and to deactivate the snubber when the dimming control signal has the off state.

17 Claims, 6 Drawing Sheets

US 10,616,967 B1

DIMMER WITH SNUBBER CONTROL CIRCUIT

BACKGROUND OF THE INVENTION

Field of the Invention

The disclosed concept relates generally to dimmers for use with a load, and in particular, to dimmers with a snubber control circuit. The disclosed concept also relates to dimmer systems.

Background Information

Dimmers provide a dimming function for loads such as lights. Dimmers are generally placed between a power source and the load and control the nature of the power provided to the load. Very simple dimmers regulate the voltage provided to the load by, for example, dividing the voltage using a variable resistor. However, dimming in this manner is inefficient as remaining power not provided to the load is dissipated as heat.

More recent dimmers cut off a part of each half-cycle of the power provided to the load. In some dimmers, the cut off is from a zero crossing in the power until a predetermined time after the zero crossing. Increasing the predetermined amount of time increases the amount of dimming. Cutting off a part of the waveform can be accomplished using a circuit component such as a triac. The more recent dimmers provide increased power efficiency over prior dimmers that used a variable resistor. The power efficiency of a dimmer is a significant concern.

In addition to power efficiency, the cost and performance quality of dimmers is also a concern. Each component added to a dimmer increases its cost. However, adding components can also increase the performance quality of dimmers. It is difficult to address power efficiency, cost, or performance quality of a dimmer without negatively affecting one of the other concerns.

There is room for improvement in dimmers.

There is also room for improvement in dimmer systems.

SUMMARY OF THE INVENTION

These needs, and others, are met by at least one embodiment of the disclosed concept in which a dimmer includes a load control circuit that controls power provided to a load based on a dimming control signal and a snubber control circuit that selectively activates and deactivates a snubber based on the same dimming control signal.

In accordance with an example embodiment of the disclosed concept, a dimmer for use with a load, a hot conductor, a load conductor, and a neutral conductor is provided. The load is electrically connected between the load conductor and the neutral conductor. The dimmer comprises: a processing unit structured to generate a dimming control signal, the dimming control signal having one of an on state and an off state, wherein in the on state the dimming control signal has a constant voltage with a low pulse a predetermined time after each zero-crossing in power flowing through the hot conductor and in the off state the dimming control signal has a constant voltage; a load control circuit structured to electrically connect between the hot conductor and the load conductor and to selectively electrically connect the hot conductor to the load conductor based on the dimming control signal; and a snubber control circuit including a snubber structured to electrically couple between the hot conductor and the load conductor, wherein the snubber control circuit is structured to activate the snubber when the dimming control signal has the on state and to deactivate the snubber when the dimming control signal has the off state.

In accordance with an example embodiment of the disclosed concept, a dimmer system comprises: a load; a hot conductor structured to electrically connect to a power source; a neutral conductor structured to electrically connect to the power source; a load conductor, the load being electrically connected between the load conductor and the neutral conductor; and a dimmer. the dimmer comprises: a processing unit structured to generate a dimming control signal, the dimming control signal having one of an on state and an off state, wherein in the on state the dimming control signal has a constant voltage with a low pulse a predetermined time after each zero-crossing in power flowing through the hot conductor and in the off state the dimming control signal has a constant voltage; a load control circuit electrically connected between the hot conductor and the load conductor and structured to selectively electrically connect the hot conductor to the load conductor based on the dimming control signal; and a snubber control circuit including a snubber electrically coupled between the hot conductor and the load conductor, wherein the snubber control circuit is structured to activate the snubber when the dimming control signal has the on state and to deactivate the snubber when the dimming control signal has the off state.

In accordance with an example embodiment of the disclosed concept, a dimmer comprises: a processing unit structured to generate a dimming control signal, the dimming control signal having one of an on state and an off state, wherein in the on state the dimming control signal has a constant voltage with a low pulse at predetermined intervals and in the off state the dimming control signal has a constant voltage; a load control circuit including a triac, wherein the load control circuit is structured to turn on the triac in response to the low pulse in the dimming control signal; and a snubber control circuit including a snubber, wherein the snubber control circuit is structured to activate the snubber when the dimming control signal has the on state and to deactivate the snubber when the dimming control signal has the off state.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
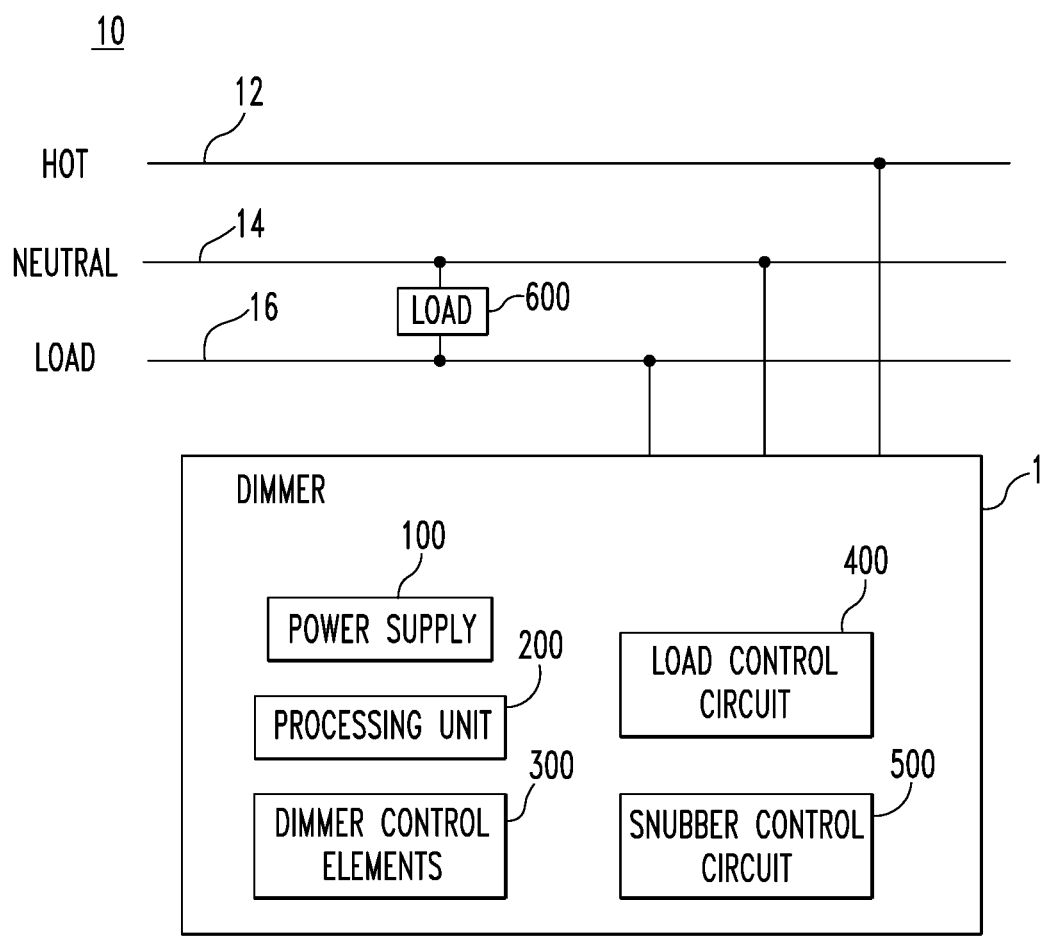
FIG. 1 is a schematic diagram of a dimmer system including a dimmer in accordance with an example embodiment of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the term "number" shall mean one or an integer greater than one (i.e., a plurality).

FIG. 1 is a schematic diagram of a dimmer system 10 including a dimmer 1 in accordance with an example embodiment of the disclosed concept. The dimmer system includes a HOT conductor 12, a NEUTRAL conductor 14, and a LOAD conductor 16. The HOT conductor 12 and NEUTRAL conductor 14 may be electrically connected to a power source such as 120Vac residential power or another suitable power source. A load 600, such as a light, is electrically connected between the NEUTRAL conductor 14 and the LOAD conductor 16. The dimmer 1 is structured to control dimming of the load 600 by controlling the nature of the power provided to the LOAD conductor 16. For example, in some example embodiments, the dimmer 1 is structured to cut off a part of the waveform provided to the LOAD conductor 16 each half-cycle. The power provided to the LOAD conductor 16 passes through the load 600 to the NEUTRAL conductor 14 to power the load 600.

The dimmer 1 includes a power supply 100, a processing unit 200, dimmer control elements 300, a load control circuit 400, and a snubber control circuit 500. The dimmer 1 is electrically connected to the HOT, NEUTRAL, and LOAD conductors 12,14,16. The power supply 100 is structured convert power received via the HOT and NEUTRAL conductors 12,14 for use by various components in the dimmer 1. For example, the power supply 100 is structured to perform an AC/DC conversion on power received via the HOT and NEUTRAL conductors 12,14 and to provide DC power for use by various components in the dimmer 1 such as the processing unit 200, the load control circuit 400, and the snubber control circuit 500.

The processing unit 200 includes a processor and a memory. The processor may be, for example and without limitation, a microprocessor, a microcontroller, or some other suitable processing device or circuitry, that interfaces with the memory. The memory can be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The processing unit 200 is structured to provide one or more control signals to control functionality of the dimmer 1. For example, the processing unit 200 is structured to generate and output a dimming control signal to both the load control circuit 400 and the snubber control circuit 500. In some example embodiments, the dimming control signal has an on state and an off state. In the off state, the dimming control signal is a constant voltage. In the on state, the dimming control signal is a constant voltage that has a low pulse at predetermined intervals such once each half-cycle of the power received via the HOT conductor 12. The low pulse is a predetermined time after each zero-crossing in the power received via the HOT conductor 12. The processing unit 200 is structured to control the length of the predetermined time. For example, by increasing the predetermined time, dimming of the load 600 may be increased and by decreasing the predetermined time, dimming of the load 600 may be decreased.

The processing unit 200 is electrically connected to the HOT conductor 12. The processing unit 200 is structured to detect zero-crossings in power received via the HOT conductor 12 and may generate a zero-crossing signal, such as a square wave that is toggled at each detected zero-crossing in power received via the HOT conductor 12.

The dimmer control elements 300 include a number of control elements actuatable by a user to control dimming of the load 600. In some example embodiments, the dimmer control elements 300 include buttons such as a dim up button 302, an on/off button 304, and a dim down button 306 (shown in FIG. 2). However, it will be appreciated by those having ordinary skill in the art that other control elements, such as, for example, dials, sliders, a touch screen, or other control elements may be employed in place of or in addition to buttons without departing from the scope of the disclosed concept. The processing unit 200 is structured to sense actuation of the dimmer control elements 300 and to generate the dimming control signal based on the manipulation of the dimmer control elements 300. For example, in response to sensing that the on/off button 304 has been pressed, the processing unit 200 will toggle the dimming control signal between the on and off states. In response to sensing the dim up button 302 has been pressed, the processing unit 200 will increase the predetermined time between a zero-crossing and the low pulse. Similarly, in response to sensing the dim down button 306 has been pressed, the processing unit 200 will decrease the predetermined time between a zero-crossing and the low pulse.

The load control circuit 400 is structured to control the power provided to the load 600 via the LOAD conductor 16 based on the dimming control signal. For example, the load control circuit 400 is structured to cut off power from the HOT conductor 12 to the LOAD conductor 16 each half-cycle from the zero-crossing until the low pulse in the dimming control signal and then to provide power from the HOT conductor 12 to the LOAD conductor 16 for the remainder of the half-cycle. The result is a truncated waveform provided to the load 600. In the case that the dimming control signal is in the off state, there will be no low pulse so no power will be provided from the HOT conductor 12 to the LOAD conductor 16.

The snubber control circuit 500 includes a snubber coupled between the HOT conductor 12 and the LOAD conductor 16. The snubber reduces transients in the power provided to the load 600 and, thus, increases the performance quality of the dimmer 1. However, leakage current could occur if the snubber were constantly connected between the HOT conductor 12 and the LOAD conductor 16 and reduce the power efficiency of the dimmer 1. The snubber control circuit 500 is structured to selectively connect (i.e., activate) and isolate (i.e., deactivate) the snubber between the HOT conductor 12 and the LOAD conductor 16 based on the dimming control signal. In some example embodiments, the snubber control circuit 500 is structured to connect the snubber between the HOT conductor 12 and the LOAD conductor 16 when the dimming control signal is in the on state and to isolate the snubber between the HOT conductor 12 and the LOAD conductor 16 when the dimming control signal is in the off state. In this manner, the snubber is only connected between the HOT conductor 12 and the LOAD conductor 16 when the dimmer 1 is providing power to the load 600. Additionally, with the load control circuit 400 and the snubber control circuit 500 both using the dimming control signal, the number of outputs of the processing unit 200 is not increased.

Figure 2:
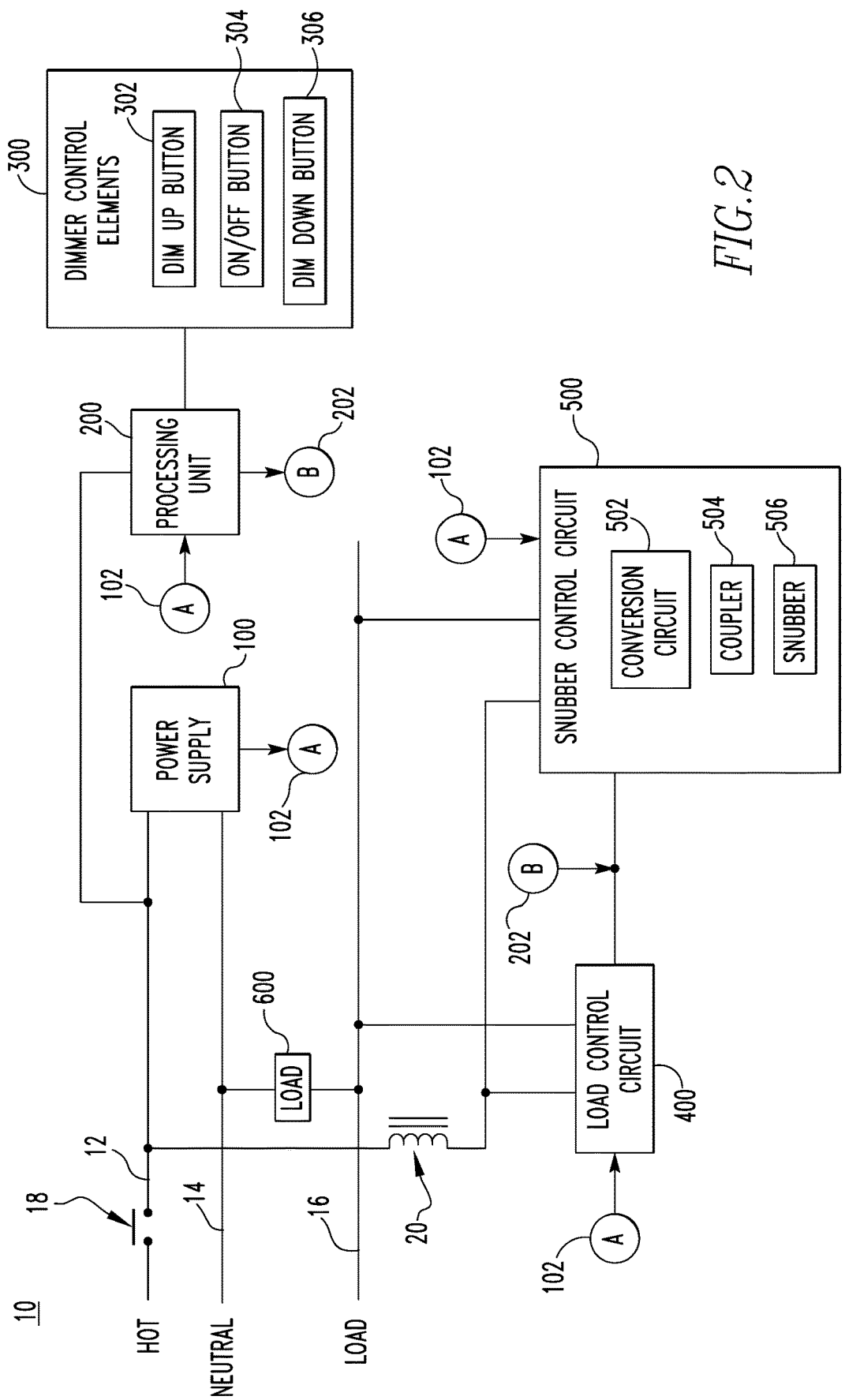
FIG. 2 is a schematic diagram of a dimmer system including a dimmer shown in more detail in accordance with an example embodiment of the disclosed concept.

FIG. 2 is a schematic diagram of the dimmer system 10 shown in more detail in accordance with an example embodiment of the disclosed concept. In the example embodiment shown in FIG. 2, the dimmer system 10 also includes an air-gap switch 18 electrically connected in series with the HOT conductor 12 and an indictor 20 electrically connected between the HOT conductor 12 and the load control circuit 400. However, it will be appreciated by those having ordinary skill in the art that the air-gap switch 18 and the inductor 20 may be omitted without departing from the scope of the disclosed concept.

In the example embodiment shown in FIG. 2, the power supply 100 has a power supply output 102. In some example embodiments, one or more DC voltages are output at the power supply output 102. Any suitable voltage may be output at the power supply output 102. In some example embodiments of the disclosed concept, 3.3V is output at the power supply output 102. As shown in FIG. 2, the power supply output 102 is electrically connected to the processing unit 200, the load control circuit 400, and the snubber control circuit 500. The processing unit 200, the load control circuit 400, and the snubber control circuit 500 may use power received from the power supply output 102 to operate.

The processing unit 200 has a dimming control signal output 202. The dimming control signal is output from the processing unit 200 via the dimming control signal output 202. The dimming control signal output 202 is electrically connected to both the load control circuit 400 and the snubber control circuit 500 such that both the load control circuit 400 and the snubber control circuit 500 can receive the dimming control signal.

In the example embodiment shown in FIG. 2, the dimmer control elements 300 include a dim up button 302, an on/off button 304, and a dim down button 306. The dim up button 302, the on/off button 304, and the dim down button 306 are structured to be actuated by a user. The processing unit 200 is structured to sense actuation of the dim up button 302, the on/off button 304, and the dim down button 306 and responsively adjust the dimming control signal.

The snubber control circuit 500 includes a conversion circuit 502, a coupler 504, and a snubber 506. The conversion circuit 502 is structured to receive the dimming control signal and convert it to an output control signal suitable for turning on and turning off the coupler 504. The coupler 504 is structured to selectively electrically connect the snubber 506 between the HOT conductor 12 and the LOAD conductor 16. The snubber 506 includes resistive and capacitive elements arranged as a snubber and is suitable for reducing transients in power. In some example embodiments, the conversion circuit 502 is structured to convert the dimming control signal having the on state to a low signal having a constant first voltage (e.g., without limitation, 0V) and to convert the dimming control signal having the off state to a high signal having a constant second voltage (e.g., without limitation, 2.5V). The low signal causes the coupler 504 to turn on and electrically connect the snubber 506 between the HOT conductor 12 and the LOAD conductor 16. The high signal causes the coupler 504 to turn off and electrically disconnect the snubber 506 between the HOT conductor 12 and the LOAD conductor 16. It will be appreciated that the low signal and the high signal may be reversed without departing from the scope of the disclosed concept.

Figure 3:
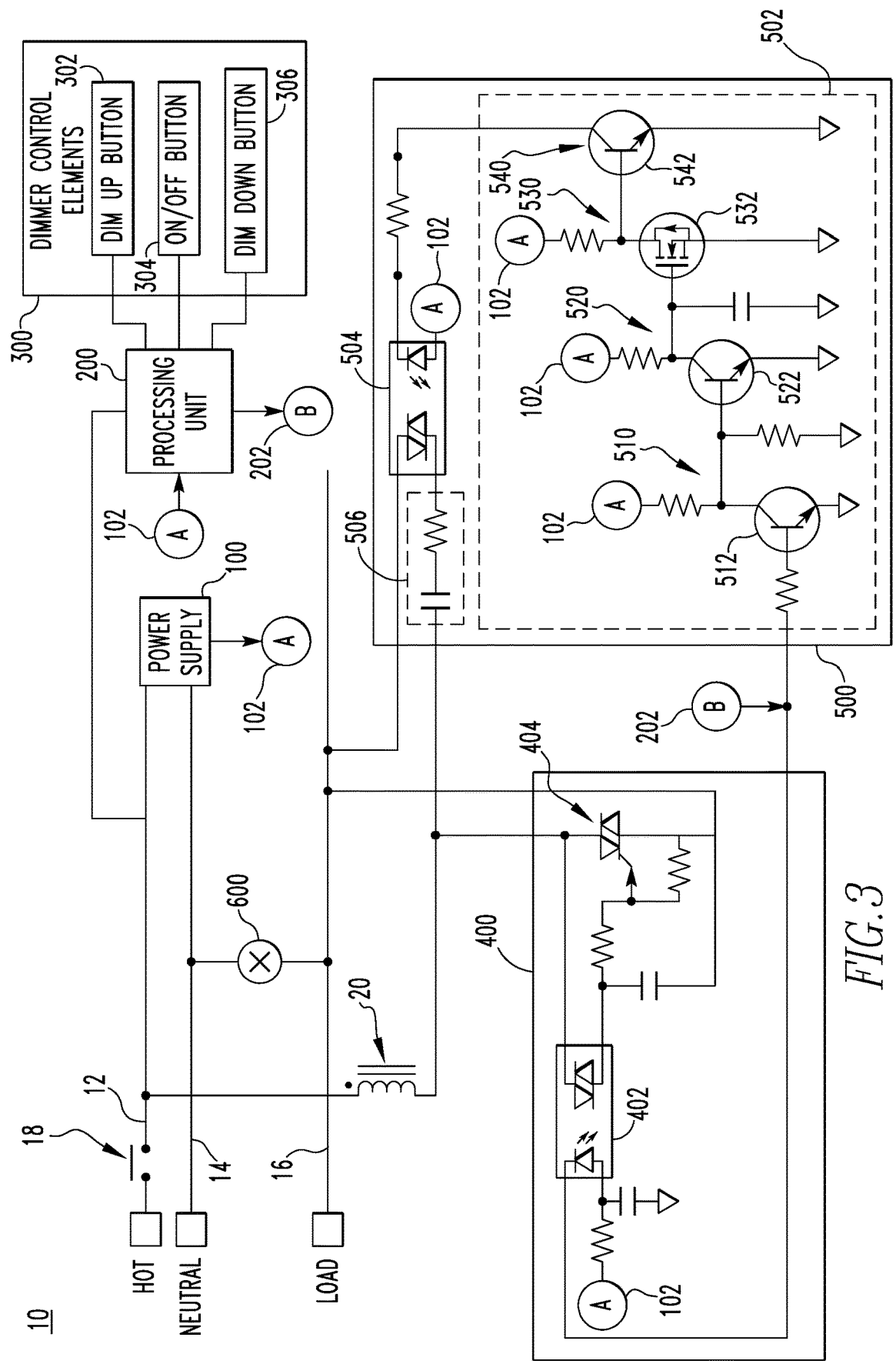
FIG. 3 is a schematic diagram including a partial circuit diagram of a dimmer in accordance with an example embodiment of the disclosed concept.

FIG. 3 is a schematic diagram including of the dimmer system 10 in accordance with an example embodiment of the disclosed concept. FIG. 3 includes circuit diagrams showing an example embodiment of the load control circuit 400 and the snubber control circuit 500 in more detail.

In the example embodiment shown in FIG. 3, the dimming control signal is received by the load control circuit 400 via the dimming control signal output 202. The load control circuit 400 includes a coupler 402 and a triac 404. An input of the coupler 402 is structured to receive the dimming control signal. Outputs of the coupler 402 are electrically coupled to the HOT conductor 12 and the gate of the triac 404. The coupler 402 is structured to turn on in response to the low pulse in the dimming control signal. When the coupler 402 turns on, power is able to flow through the outputs of the coupler 402 from the HOT conductor 12 to the gate of the triac 404, resulting in the triac 404 turning on. The coupler 402 may be, for example and without limitation, an opto-coupler. The main terminals of the triac 404 are electrically coupled between the HOT conductor 12 and the LOAD conductor 16. When the triac 404 turns on (i.e., when the coupler 402 turns on in response to the low pulse in the dimming control signal), power can flow through the triac 404 from the HOT conductor 12 to the LOAD conductor 16, and subsequently through the load 600 to the NEUTRAL conductor 14.

The snubber control circuit 500 is structured to receive the dimming control signal via the dimming control signal output 202. In the example embodiment shown in FIG. 3, the dimming control signal is received by the conversion circuit 502. The conversion circuit 502 includes a first stage 510, a second stage 520, a third stage 530, and a fourth stage 540, each including a transistor 512,522,532,542.

The first stage 510 is structured to invert the dimming control signal. In the case that the dimming control signal is on, the output of the first stage 510 is a constant low signal with a high pulse corresponding to the low pulse in the dimming control signal. In the case that the dimming control signal is off, the output of the first stage 510 is a constant low signal.

The second stage 520 is structured to invert the output of the first stage 510 and remove the high pulse. In the case that the dimming control signal is on, the output of the second stage 520 is a constant low signal with an attenuated pulse corresponding to the low pulse in the dimming control signal. The attenuated pulse is too low to turn on the transistor 532 in the third stage 530. In the case that the dimming control signal is off, the output of the second stage 520 is a constant high signal.

The third stage 530 is structured to invert the output of the second stage 520 and remove the attenuated pulse. In the case that the dimming control signal is on, the output of the third stage 530 is a constant high signal. In the case that the dimming control signal is off, the output of the third stage 530 is a constant low signal.

The fourth stage 540 is structured to invert the output of the third stage 530. In the case that the dimming control signal is on, the output of the fourth stage 540 is a constant low signal. In the case that the dimming control signal is off, the output of the fourth stage 540 is a constant high signal.

The output of the fourth stage 540 is coupled to an input of the coupler 504. The constant low signal output from the fourth stage 540 (corresponding to the dimming control signal being on) causes the coupler 504 to turn on. The constant high signal from the fourth stage 540 (corresponding to the dimming control signal being off) causes the coupler 504 to turn off. The dimming control signal itself is not suitable for turning on and off the coupler 504 because when the dimming control signal is on, it would only turn on the coupler 504 for a short time each half-cycle corresponding to the location of the low pulse. The conversion circuit 500 is used to convert the dimming control signal into signals that are suitable for turning on the coupler 504 when the dimming control signal is on and turning off the coupler 504 when the dimming control signal is off.

Inputs of the coupler 504 are coupled between the power supply output 102 and the output of the fourth stage 540 of the conversion circuit 500. When the output of the fourth stage 540 is the constant low signal, current from the power supply output 102 flows through the coupler 504 and turns it on. When the output of the fourth stage 540 is the constant high signal, current from the power supply output 102 does not flow through the coupler 504 and the coupler 504 does not turn on.

Outputs of the coupler 504 are coupled between the LOAD conductor 16 and the snubber 506. When the coupler 504 turns on, it electrically connects the snubber 506 to the LOAD conductor 16 such that current can flow from the HOT conductor 12 to the LOAD conductor 16 through the snubber 506. When the coupler 504 is on, the snubber 506 is active and can suppress transient in the power flowing from the HOT conductor 12 to the LOAD conductor 16. When the coupler 504 turns off, it electrically disconnects the snubber 506 from the LOAD conductor 16 and current cannot flow from the HOT conductor 12 to the LOAD conductor 16 through the snubber 506. When the coupler 504 is off, the snubber 506 is inactive and current does not flow through. Since the coupler 504 is only turned on when the dimming control signal is on, the snubber 506 is only active when the dimming control signal is on. When the dimming control signal is off, the snubber 506 is inactive, which prevents any current from leaking through the snubber 506 and reducing power efficiency when the dimming control signal is off. Thus, the power efficiency of the dimmer 1 is improved over leaving the snubber 506 always electrically connected between the HOT conductor 12 and the LOAD conductor 16. In some example embodiments of the disclosed concept, the coupler 506 is an opto-coupler. However, it will be appreciated by those having ordinary skill in the art that other types of coupling devices may be employed as the coupler 506.

In accordance with some example embodiments of the disclosed concept, the snubber 506 includes a resistor and a capacitor electrically connected in series. However, it will be appreciated that different suitable arrangements of electrical components may be employed as the snubber 506 without departing from the scope of the disclosed concept.

Figure 4:
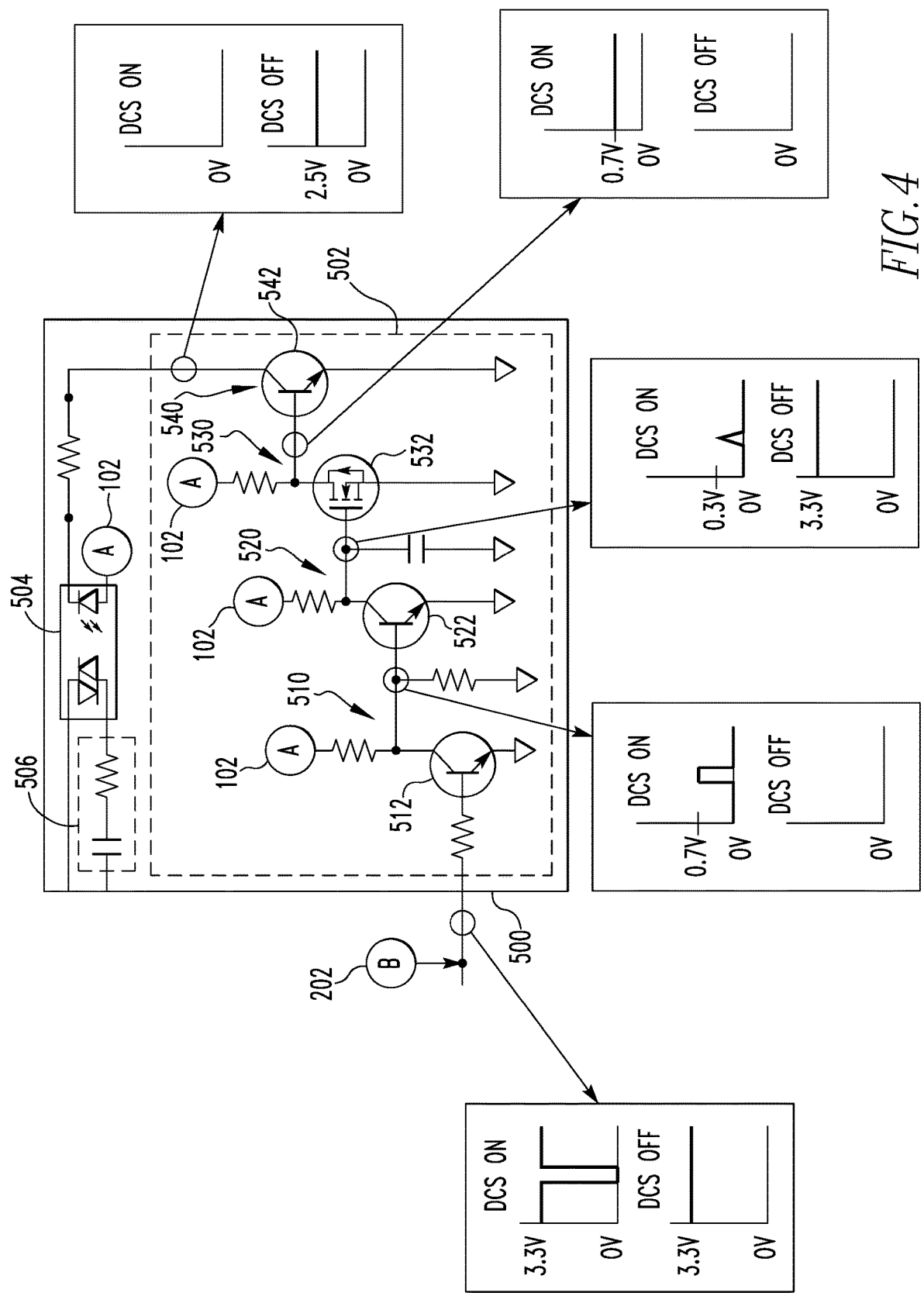
FIG. 4 is a circuit diagram of a conversion circuit in accordance with an example embodiment of the disclosed concept.
Figure 5:
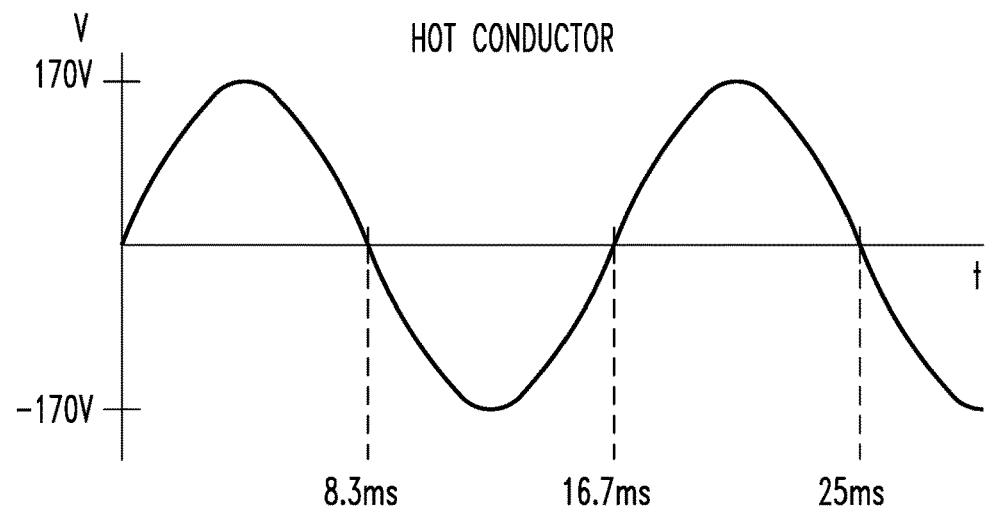
FIG. 5 includes graphs of power flowing through a HOT conductor, a zero-crossing signal, and a dimming control signal in accordance with an example embodiment of the disclosed concept.
Figure 5:
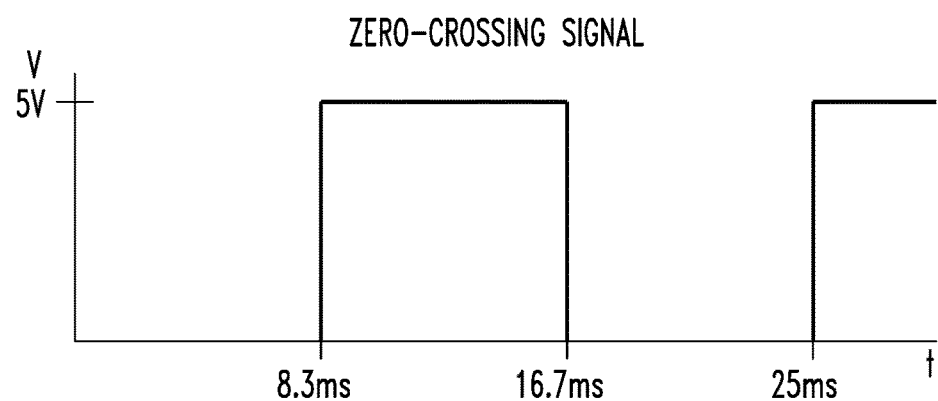
Figure 5:
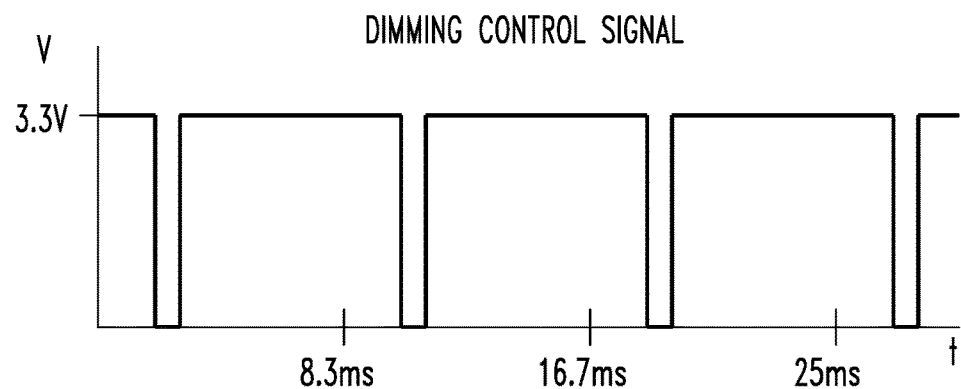

FIG. 4 is a circuit diagram of the conversion circuit 500. FIG. 5 includes example waveforms of outputs of each of the stages 510,520,530,540 of the conversion circuit 500 as well as example waveforms of the dimming control signal. As shown in FIG. 5, the dimming control signal has a low pulse each half-cycle when it is on (labeled as DCS ON in FIG. 4) and has a constant voltage when it is off (labeled as DCS OFF in FIG. 4). The output of the first stage 510 when the dimming control signal is on is a low signal with a high pulse each half-cycle. The output of the first stage 510 when the dimming control signal is off is a constant low signal. The output of the second stage 520 when the dimming control signal is on is a low signal with an attenuated pulse each half-cycle. The output of the second stage 520 when the dimming control signal is off is a constant high signal. The output of the third stage 530 when the dimming control signal is on is a constant high signal. The output of the third stage 530 when the dimming control signal is off is a constant low signal. The output of the fourth stage 540 when the dimming control signal is on is a constant low signal. The output of the fourth stage 540 when the dimming control signal is off is a constant high signal. The voltage levels of the waveforms shown in FIG. 4 are examples and it will be appreciated by those having ordinary skill in the art that values of components may be selected to change the particular voltage levels at the outputs of each stage 510,520, 530,540 without departing from the scope of the disclosed concept.

FIG. 5 is a graph of power flowing through the HOT conductor 12, a zero-crossing signal, and a dimming control signal having the on state. The zero-crossing signal is a square wave that toggles between high and low at each zero-crossing of power flowing through the HOT conductor 12. As shown in FIG. 5 the dimming control signal has a constant voltage with a low pulse that occurs a predetermined time after each zero-crossing of power flowing through the HOT conductor 12.

Figure 6:
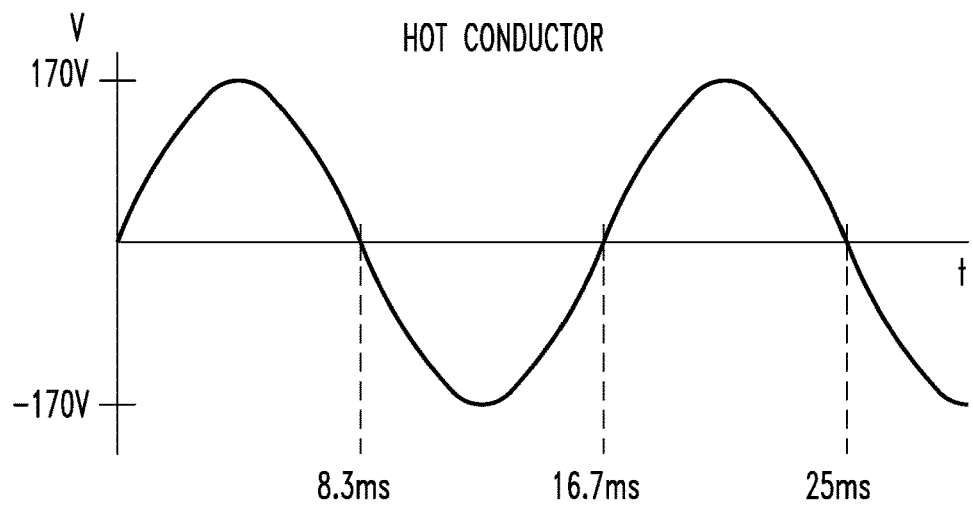
FIG. 6 includes graphs of power flowing through a HOT conductor, power provided to a LOAD conductor, and a dimming control signal in accordance with an example embodiment of the disclosed concept.
Figure 6:
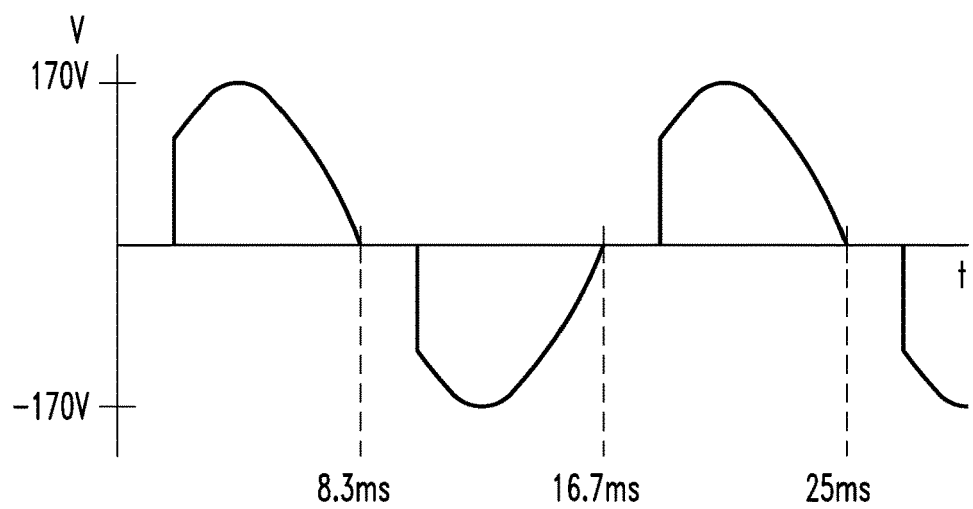
Figure 6:
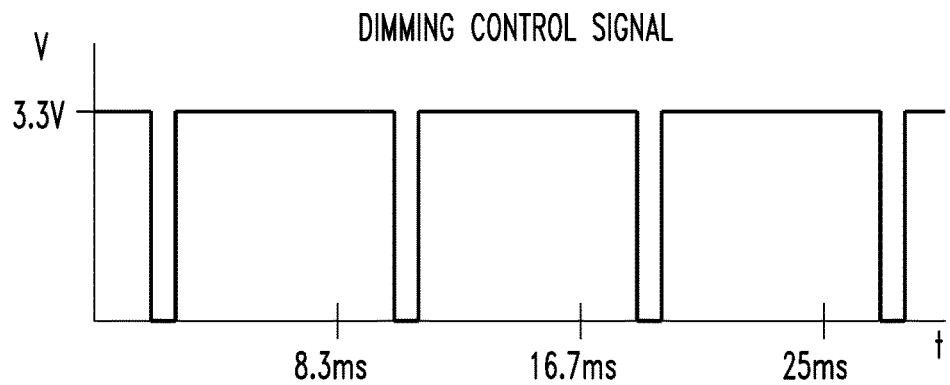

FIG. 6 is a graph of power flowing through the HOT conductor 12, power provided to the LOAD conductor 16, and the dimming control signal having the on state. As shown in FIG. 6, after each zero-crossing of power flowing through the HOT conductor 12, no power is provided to the LOAD conductor 16 until the low pulse in the dimming control signal. The low pulse in the dimming control signal causes the triac 404 in the load control circuit 400 to turn on. At this point power from the HOT conductor 12 is provided to the LOAD conductor 16 via the triac 404. As shown in FIG. 6, beginning at the low pulse in the dimming control signal and continuing to the next zero-crossing of power flowing through the HOT conductor 12, the power provided to the LOAD conductor 16 has a similar waveform to the power flowing through the HOT conductor 12.

In accordance with example embodiments of the disclosed concept, the dimmer 1 includes the load control circuit 400 that controls power provided to the LOAD conductor 16 based on the dimming control signal and the snubber control circuit 500 that controls activating and deactivating the snubber 506 based on the same dimming control signal.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A dimmer for use with a load, a hot conductor, a load conductor, and a neutral conductor, the load being electrically connected between the load conductor and the neutral conductor, the dimmer comprising:
a processing unit structured to generate a dimming control signal, the dimming control signal having one of an on state and an off state, wherein in the on state the dimming control signal has a constant voltage with a low pulse that occurs a predetermined time after each zero-crossing in power flowing through the hot conductor and in the off state the dimming control signal has the constant voltage;

a load control circuit structured to electrically connect between the hot conductor and the load conductor and to selectively electrically connect the hot conductor to the load conductor based on the dimming control signal; and a snubber control circuit including a snubber structured to electrically couple between the hot conductor and the load conductor, wherein the snubber control circuit is structured to activate the snubber when the dimming control signal has the on state and to deactivate the snubber when the dimming control signal has the off state, wherein the snubber control circuit further includes a conversion circuit structured to convert the dimming control signal into an output control signal that is a low signal when the dimming control signal is in the on state and a high signal when the dimming control signal is in the off state.

2. The dimmer of claim 1, wherein the snubber control circuit further includes:

a coupler disposed between the conversion circuit and the snubber, wherein the coupler is structured to activate the snubber by electrically connecting the snubber between the load conductor and the hot conductor when the output control signal is the low signal and to deactivate the snubber by electrically disconnecting the snubber between the load conductor and the hot conductor when the output control signal is the high signal.

3. The dimmer of claim 2, wherein the coupler includes inputs electrically connected between an output of the conversion circuit and a power supply and outputs electrically connected between the snubber and the load conductor.

4. The dimmer of claim 2, wherein the coupler is an opto-coupler.

5. The dimmer of claim 2, wherein the conversion circuit includes a first stage, a second stage, a third stage, a fourth stage, wherein the first stage is structured to invert the dimming control signal, wherein the second stage is structured to invert an output of the first stage and attenuate a high pulse from the output of the first stage, wherein the third stage is structured to invert an output of the second stage and remove an attenuated pulse from the output of the second stage, and wherein the fourth stage is structured to invert an output of the third stage.

6. The dimmer of claim 5, wherein the first stage, the second stage, the third stage, and the fourth stage each include a transistor.

7. The dimmer of claim 1, wherein the snubber includes a resistor and a capacitor electrically connected in series.

8. The dimmer of claim 1, further comprising:

a number of dimmer control elements actuatable by a user, wherein the processing unit is structured sense actuation of the number of dimmer control elements and to generate the dimming control signal based on actuation of the dimmer control elements by the user.

9. The dimmer of claim 8, wherein the number of dimmer control elements include a dim up button, an on/off button, and a dim down button, wherein the processing unit is structured to increase the predetermined time in response to actuation of the dim up button, wherein the processing unit is structured to decrease the predetermined time in response to actuation of the dim down button, and wherein the processing unit is structured to toggle the dimming control signal between the on state and the off state in response to actuation of the on/off button.

10. The dimmer of claim 1, wherein the load control circuit includes a coupler structured to receive the dimming control signal and a triac structured to electrically couple between the hot conductor and the load conductor.

11. The dimmer of claim 10, wherein the coupler is structured to turn off the triac at each zero-crossing in power flowing through the hot conductor to prevent power from flowing from the hot conductor to the load conductor, and wherein the coupler is structured to turn on the triac at each low pulse in the dimming control signal to allow power to flow from the hot conductor to the load conductor.

12. The dimmer of claim 1, further comprising:

a power supply structured to convert power from the hot conductor and the neutral conductor to DC power usable by at least one of the processing unit, the load control circuit, and the snubber control circuit.

13. A dimmer system comprising:

a load;

a hot conductor structured to electrically connect to a power source;

a neutral conductor structured to electrically connect to the power source;

a load conductor, the load being electrically connected between the load conductor and the neutral conductor; and a dimmer comprising:

a processing unit structured to generate a dimming control signal, the dimming control signal having one of an on state and an off state, wherein in the on state the dimming control signal has a constant voltage with a low pulse that occurs a predetermined time after each zero-crossing in power flowing through the hot conductor and in the off state the dimming control signal has the constant voltage;

a load control circuit electrically connected between the hot conductor and the load conductor and structured to selectively electrically connect the hot conductor to the load conductor based on the dimming control signal; and a snubber control circuit including a snubber electrically coupled between the hot conductor and the load conductor, wherein the snubber control circuit is structured to activate the snubber when the dimming control signal has the on state and to deactivate the snubber when the dimming control signal has the off state, wherein the snubber control circuit further includes a conversion circuit structured to convert the dimming control signal into an output control signal that is a low signal when the dimming control signal is in the on state and a high signal when the dimming control signal is in the off state.

14. The dimmer system of claim 13, wherein the conversion circuit includes a first stage, a second stage, a third stage, a fourth stage, wherein the first stage is structured to invert the dimming control signal, wherein the second stage is structured to invert an output of the first stage and attenuate a high pulse from the output of the first stage, wherein the third stage is structured to invert an output of the second stage and remove an attenuated pulse from the output of the second stage, and wherein the fourth stage is structured to invert an output of the third stage.

15. The dimmer system of claim 14, wherein the coupler includes inputs electrically connected between an output of the conversion circuit and a power supply and outputs electrically connected between the snubber and the load conductor.

16. A dimmer comprising:
- a processing unit structured to generate a dimming control signal, the dimming control signal having one of an on state and an off state, wherein in the on state the dimming control signal has a constant voltage with a low pulse that occurs at predetermined intervals and in the off state the dimming control signal has the constant voltage;
- a load control circuit including a triac, wherein the load control circuit is structured to turn on the triac in response to the low pulse in the dimming control signal; and
- a snubber control circuit including a snubber, wherein the snubber control circuit is structured to activate the snubber when the dimming control signal has the on state and to deactivate the snubber when the dimming control signal has the off state, wherein the snubber control circuit further includes a conversion circuit structured to convert the dimming control signal into an output control signal that is a low signal when the dimming control signal is in the on state and a high signal when the dimming control signal is in the off state.

17. The dimmer of claim 16, wherein the conversion circuit includes a first stage, a second stage, a third stage, a fourth stage, wherein the first stage is structured to invert the dimming control signal, wherein the second stage is structured to invert an output of the first stage and attenuate a high pulse from the output of the first stage, wherein the third stage is structured to invert an output of the second stage and remove an attenuated pulse from the output of the second stage, and wherein the fourth stage is structured to invert an output of the third stage.

* * * * *